Figure 1:
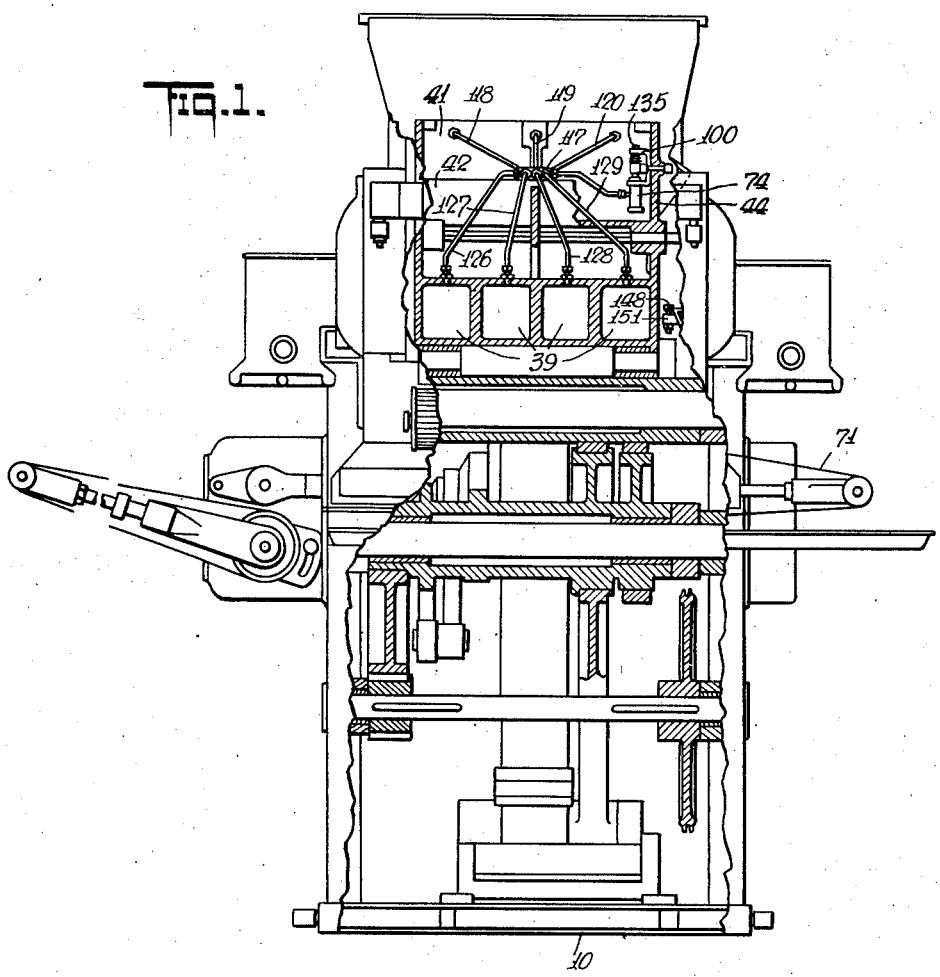

April 28, 1942. E. H. KOCHER 2,280,834
DOUGH DIVIDER MECHANISM
Filed Aug. 3, 1940 4 Sheets-Sheet 1

INVENTOR
*Edward H. Kocher*
BY
ATTORNEYS

April 28, 1942.  E. H. KOCHER  2,280,834
DOUGH DIVIDER MECHANISM
Filed Aug. 3, 1940  4 Sheets-Sheet 2
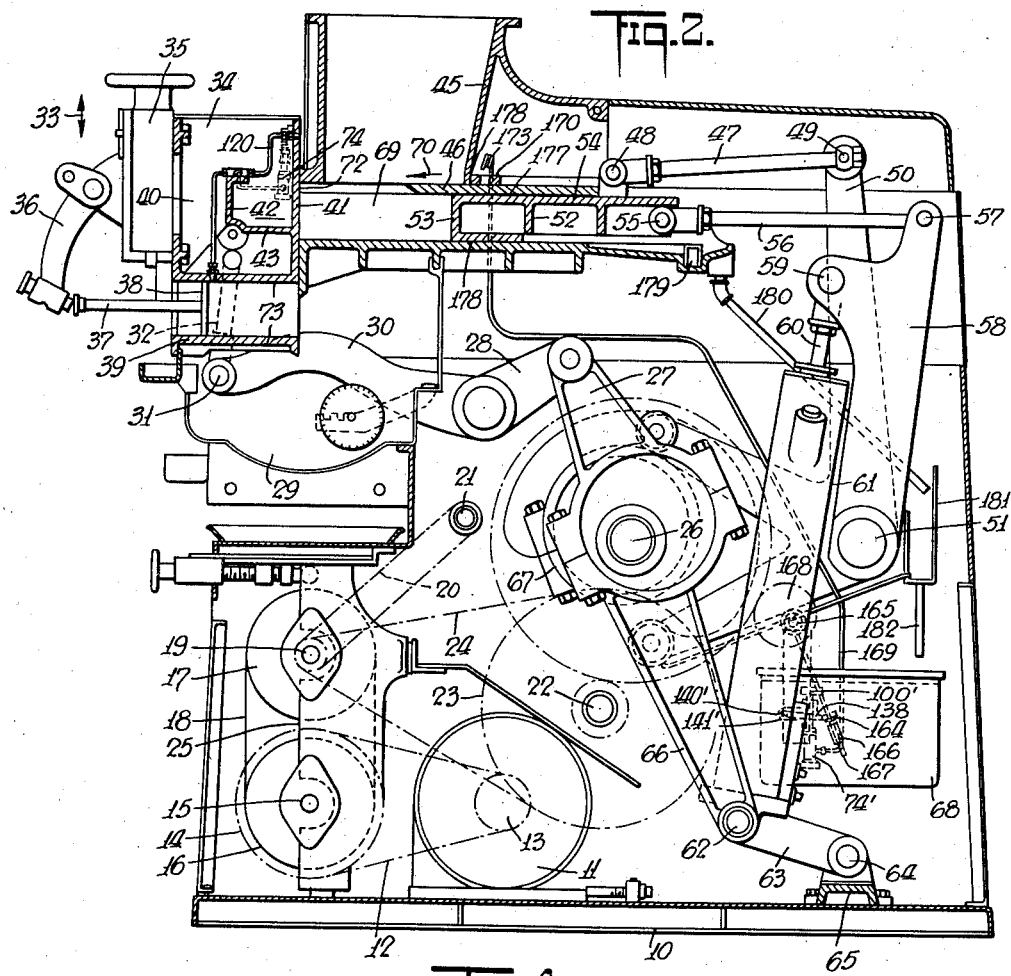
INVENTOR
Edward H. Kocher
BY
ATTORNEYS April 28, 1942.   E. H. KOCHER   2,280,834
DOUGH DIVIDER MECHANISM
Filed Aug. 3, 1940   4 Sheets-Sheet 3
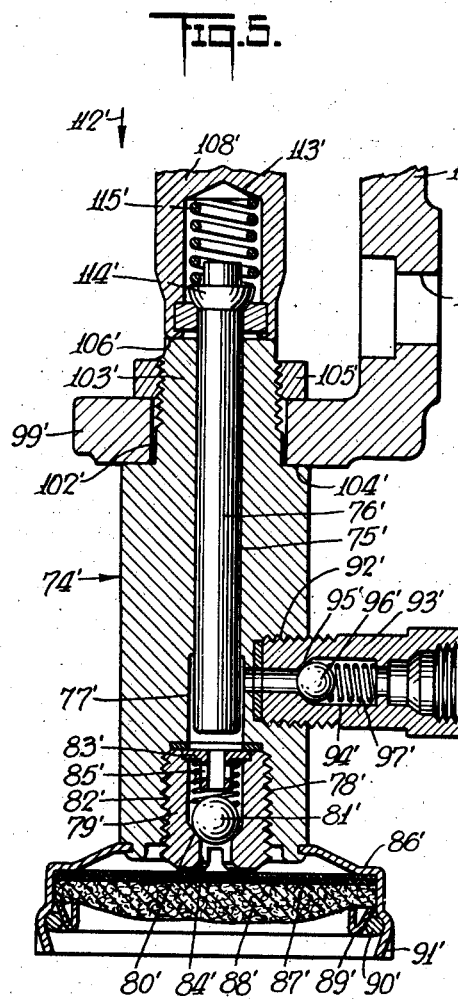
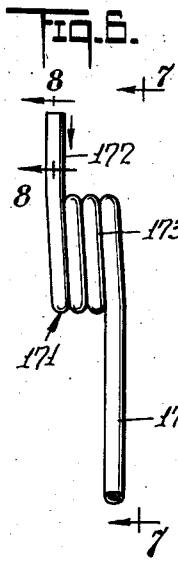
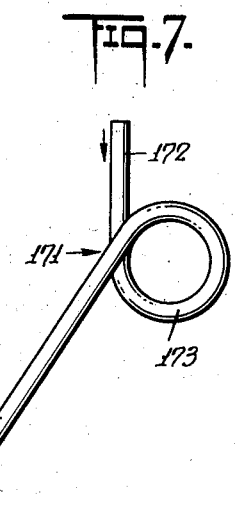
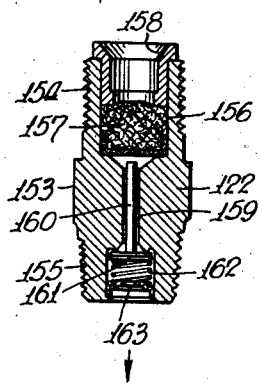
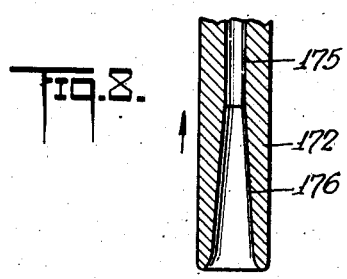
INVENTOR
*Edward H. Kocher*
BY
ATTORNEYS April 28, 1942.   E. H. KOCHER   2,280,834
DOUGH DIVIDER MECHANISM
Filed Aug. 3, 1940   4 Sheets-Sheet 4
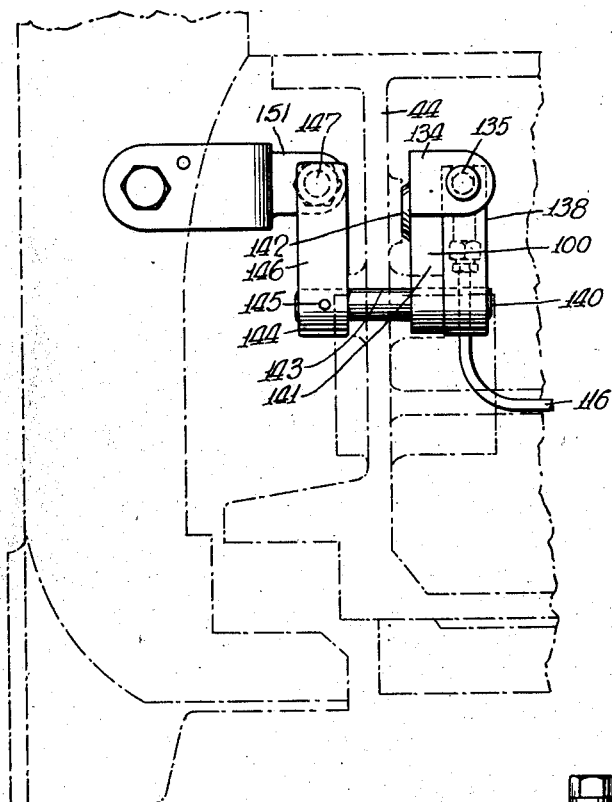
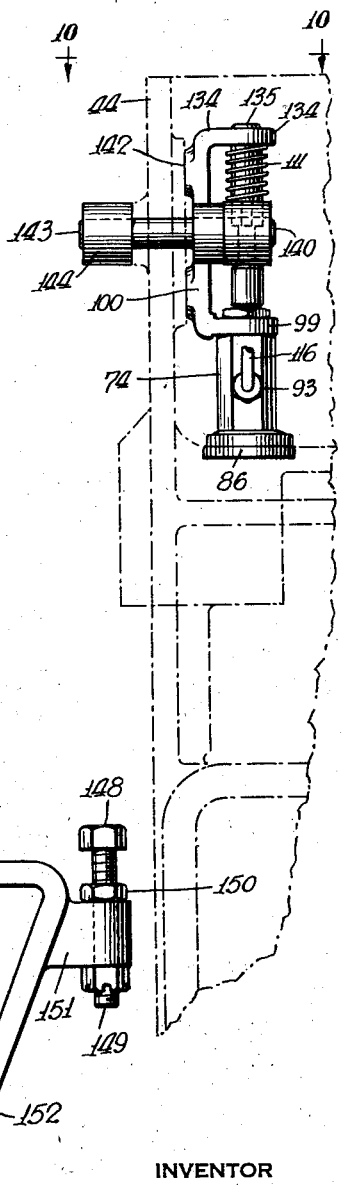
INVENTOR
*Edward H. Kocher*
BY
ATTORNEYS Patented Apr. 28, 1942

2,280,834

UNITED STATES PATENT OFFICE 2,280,834

DOUGH DIVIDER MECHANISM

Edward H. Kocher, Boonton, N. J., assignor to Auto Research Corporation, a corporation of Delaware Application August 3, 1940, Serial No. 350,645

5 Claims. (Cl. 107—15)

The present invention relates to a dough divider mechanism and it particularly relates to a lubricated dough divider mechanism.

Although not limited thereto, the present invention will be particularly described in connection with built-in lubrication installations for dough divider mechanisms, particularly where division box and pistons of such mechanism on one hand, and the knife, ram and top box of such mechanism on the other hand are automatically lubricated during the operation of the machine.

It is among the objects of the present invention to provide an automatically lubricated dough divider mechanism of the character above described, in which the division box and pistons and also the knife, ram and top box will be automatically lubricated throughout the operation of the machine, with assurance that at all times there will be supplied the necessary amount of lubricant for proper operation with constant checking by the operator.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accomplishing the above objects, it has been found most satisfactory according to one embodiment of the present invention to provide lubricant receiving recesses or receptacles, preferably for a tasteless, odorless and colorless mineral oil.

The recess is desirably positioned in and forming part of the reciprocating division box with a plurality of outlets to supply lubricant to the bearing contact faces of the division box, as well as the interior surfaces of the piston receiving cylinder members.

This pump for feeding the junction box, as well as the piston pockets, is preferably actuated once with each reciprocation of the divider box.

At a lower position on the machine adjacent the base thereof, there is positioned another recess or reservoir having a reciprocating pump which may be driven from an eccentric on a drive gear. This pump will have a plurality of restricted outlet tubes to feed excess quantities of lubricant to the knife, ram and top box, which excess lubricant will be collected, filtered and returned to the reservoir.

Figure 3:
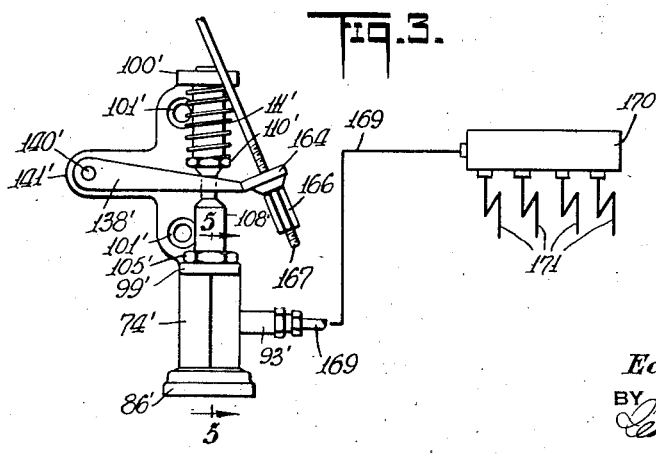

Referring to the drawings which illustrate one of the embodiments according to the present invention, to which the invention is by no means restricted, since the drawings are merely by way of illustration and not by way of limitation:

Fig. 1 is a front diagrammatic view in partial section of a dough divider machine illustrating the application of a lubricating installation according to the present invention to the division box and piston pockets, Fig. 2 is a diagrammatic side sectional view of the machine of Fig. 1, showing a side view of the lubricating installation applied to the division box and piston pockets and also the lubricating installation as applied to the ram, knife and top box construction, Figs. 3 and 4 are schematic views showing the layout of the lubricating installations respectively, Fig. 3 showing the application of such lubricating installation to the knife, ram and top box, while Fig. 4 shows the application of the lubricating installation to the division box and bearings, Fig. 5 is a detailed longitudinal sectional view upon an enlarged scale as compared to Figs. 1 and 2, showing the pump construction, Figs. 6, 7 and 8 illustrate the restricted lubricant proportioning tubes which are utilized in the construction of Fig. 3 to lubricate the knife, ram and top box of the machine, Fig. 6 being an end view, Fig. 7 being a side view upon the line 7—7 of Fig. 6, and Fig. 8 being a longitudinal sectional view upon the line 8—8 of Fig. 6, upon an enlarged scale as compared to Fig. 6, Fig. 9 is a longitudinal sectional view of a type of high restriction metering fitting, which may be utilized to form an outlet for the lubricant distributing installation of Fig. 4 as applied to the lubrication of the division box and piston, Figs. 10 and 11 are enlarged showings of the attachment of the pump for the system of Fig. 4, to the mechanism, Fig. 10 being a top view and Fig. 11 being a side view.

Referring to Figs. 1 and 2, the dough divider mechanism has the base structure 10 (see Fig. 2), which carries the driving motor 11, which drives the chain or belt 12 by the pulley 13.

The belt in turn drives the pulley 14. The pulley 14 is connected to a shaft 15, which carries the pulley 16, which in turn drives the pulley 17 through the belt 18. The shafts 15 and 19 are associated with the variable speed transmission mechanism 25.

Mounted on the shaft 19 are a series of pulleys which drive the conveyor drive shaft 21 through the belt, or chain 20 and the countershaft 22 and the pulley 23 by the belt or chain drive 24.

The mechanism just described will drive the cam shaft or division box lever shaft 26, which drives the arm 27 connected to the link 28, connected to the arm 30. The forward end of the arm 30 is connected at 31 to the division box connecting rod 32, which causes vertical reciprocatory movement, as indicated by the arrow 33 of the division box 34, having the adjustment 35.

The division box 34 is connected by the arm 36 and the connecting rod 37 to the pistons 38, which reciprocate in the piston boxes, four of which are shown positioned side by side as indicated at 39 in Fig. 1.

The division box is provided with a reservoir 40, which has the walls 41 and 42 and the bottom 43 shown in Fig. 2, and the side wall 44 shown in Fig. 1 for a tasteless, odorless and colorless mineral oil.

The top of the machine is provided with a hopper 45, which receive the dough. The dough is cut off by the reciprocating knife 46 driven by the rod 47 having the pivot mounts at 48 and 49.

The pivot mount 48 is connected to the knife 46, while the pivot mount 49 is connected to the lever 50, which is mounted on the arm 51. Below the knife there is positioned a ram 52 having the front pushing face 53 and the sliding top face 54, which has a pivotal connection at 55 to an actuating rod 56.

Said rod 56 is pivotally connected at 57 to the ram lever 58, which has a pivotal connection at 59 to the shaft 60 extending into the spring housing 61.

The spring housing 61 has a lower pivotal connection 62 to the arm 63, which is pivotally mounted at 64 to the base 65. Pivotally mounted to the bearing 62 is also the ram eccentric lever 66, which extends upwardly to the eccentric member 67.

Positioned in the lower rear of the mechanism is the reservoir 68, which receives oil for feed to the bearings of the knife 46 and the ram 52.

In the operation of the dough divider, the dough will be placed into the hopper 45 and will pass into the space 69, where it will be cut upon movement of the knife in the direction 70. Then the division box 34 will be elevated from the eccentric 26 and the connecting members 27, 28, 30 and 32 to a point where the piston pockets will be directly opposite the space 69. The ram 52 will then move in the direction 70, forcing the dough which has been cut into the piston pockets 39.

The division box 34 will then move downwardly and the pistons 38 will force the dough out of the pockets between the separators 29 onto a conveyor belt, which is best indicated at 71 in Fig. 1.

Now, in connection with the lubrication of the bearing face 72 (see Fig. 2), as well as the bearing faces 73 of the piston pockets 39, to which the present invention is most particularly directed, the pump 74 will have the construction more fully shown in connection with Figs. 3 and 5.

In connection with the lubricating installation of Fig. 4, the outlet fitting 93 of the pump 74 will be connected to an outlet tube 116, which feeds the junction 117. The junction 117 has the outlet connections 118, 119 and 120 feeding the upper part of the bearing face 72 through the high restriction flow metering fittings 122, 123 and 124 (see particularly Figs. 2 and 4).

The junction also feeds the lines 126, 127, 128 and 129 connected to the high restriction flow metering fittings 130, 131, 132 and 133, each of which is connected to feed lubricant into one of the piston pockets 39, as best shown in Fig. 1.

As shown in Fig. 4, the upper leg 134 of the bracket 100 forms a bearing for the connecting rod extension 135. The extension 135 is connected by reduced diameter portion 136 to the lower connecting rod section 108. Said reduced diameter portion is embraced by the clevis 137 of the lever 138, which has an eye 139 mounted on the shaft 140. This shaft 140 is mounted on an extension 141 from the base of the bracket 100.

As shown in Fig. 10, the base of the bracket 100 is bolted at 142 to the wall 44 of the reservoir 40 and the shaft 140 has a bearing at 143 in said wall 44. The shaft 140 is fixed by the pin 145 exteriorly of the wall 44 to the eye 144 of the lever 146. The end 147 of the lever 146 is designed to strike the head 148 of the adjustable bolt 149.

The bolt 149 is locked in adjusted position by the lock nut 150 and is mounted on the fixed arm 151 attached to the structure 152, so that it will strike the contact end 147 of the lever once upon each reciprocation of the division box 34, causing a stroke of the pump and supply of lubricant to the bearing face of the division box, as well as to the piston pockets.

It will be noted that there are three lubricant outlets to the bearing face of the division box, while there are four outlets to the piston pockets 39, one to each pocket.

Each of the high restriction flow metering fittings indicated at 122 to 124 and 130 to 133, all inclusive, may be of the construction illustratively illustrated in the longitudinal section in Fig. 9 for the unit 122.

As indicated, the unit 122 has a hexagon body at 153 with a machine threaded inlet end 154 and a pipe threaded outlet end 155. The inlet end of the fitting 122 has a socket 156 receiving the strainer 157 and the retainer 158, which also acts to receive a double tapered coupling sleeve of the coupling connection (not shown).

The central bore 149 is substantially completely filled by the pin 160 to form a narrow annular crevice of the order of a thousandths or several thousandths of an inch, which has the substantially greater restricting and obstructing effect than the conduit system or the bearings—say 10 to 100 times—so that it will in itself predominantly control the proportionment of lubricant among the various bearings of the division box 34 and piston pockets 39.

The outlet check valve 161, which is seated by the spring 162, provided with the valve retainer 163 will not afford any substantial obstruction to the flow of lubricant, but will keep the system filled with oil, since it will prevent ingress of air at a higher outlet with dripping or leakage of lubricant at a lower outlet.

In the system for lubricating the top box and the knife 46, the ram 52, the pump 74' (see Figs. 2 and 3) may be of the same construction as the pump 74 of Fig. 5, similarly functioning parts being indicated by the same numerals primed.

The construction of the pumps of Figs. 3 and 4 is apparent from the section of Fig. 5 of the pump of Fig. 3.

As shown in Fig. 5, the pump 74' has a central bore 75' receiving the elongated unpacked piston plunger 76', which extends into the enlargement 77', which forms a charge and discharge chamber.

The enlarged passage 77' extends into the tapped portion 78', which receives the threaded sleeve 79' having an interiorly bevelled face 80', forming a seal for the ball check 81'.

The spring 82' which seats the ball check 81' is provided with a spring retainer 83'. The lubricant passes upwardly through the lower opening 84' and out through the openings 85' in the retainer 83' for the spring 82'.

To the lower portion of the pump body 74' is attached the strainer cup 86' having the screws 87' and the felt strainer 88', which is held in position by the clamp member 89' and the spring ring 90'. The spring ring 90' snaps inside of the indented portions 91' at the end of the skirt of the cup 86'.

As shown in Figs. 2 and 3, the bracket 100' is provided with an outstanding arm 141' on which is pivotally mounted the lever 138' at 140'. Said lever has a ball connection at 164 resting upon the adjustable nut or sleeve 166 fixed to the rod 167.

The rod 167 is pivotally connected at off-center at 165 to the drive pinion 168, which upon being driven by the mechanism of the machine, will cause said pump to take charging and discharging strokes and force lubricant out into the upwardly extending lubricant conduit 169.

The upwardly extending lubricant conduit 169 passes to a junction 170, where the lubricant is distributed by a series of tubes 171 to the four ram constructions. These tubes 171 are best shown in Figs. 6, 7 and 8, and as indicated, they have inlet ends 172, coil portions 173 to give the necessary restricting effect and the outlet drip portions 174.

The bores of the tubes are of very small diameter, as indicated at 175 in Fig. 8, and the tubes, as shown, may have an outside diameter of 3/32 of an inch, with a 0.055 inch wall thickness and a developed length of 12½ inches.

In the form as shown, the extra length is accomplished by giving the tube about 3 turns between its inlet end 172 and its outlet end 174.

It will be noted that from the inlet end 172, as indicated in Fig. 8, the bore gradually converges at 176 to the small bore 175. Since these tubes 171 are all at the same level, the elongated very small diameter bores will be sufficient to assure satisfactory distribution of lubricant among the knife bearings. This lubricant will flow to the contacting surfaces 177 and 178 of the knife, as well as to the lower contacting surface 178 of the ram 52.

The excess lubricant will be collected in the gutter 179 and flow back at 180 to the receiving chamber 181, where it will be filtered and then flow through the outlet 182 into the reservoir 68.

The applicant has, therefore, provided a compact automatic continuous lubricating system, which will feed the various bearings, both of the reciprocating divider box and piston pockets, and also of the knife and ram in accordance with their needs, with return of excess quantities of lubricant from the knife and ram bearings.

In both cases, the stroke of the pump is adjustable. In the installation of Fig. 4, the adjustment is obtained by adjusting the screw 149 and in the installation of Fig. 3, the adjustment is obtained by adjusting the sleeve 164 on the pump actuating rod 167.

The lubricant will be supplied to the knife and ram bearings at the rear of the hopper at a rate proportionate to the speed of the machine, and it will be supplied to the divider box bearings, as well as to the piston pockets in accordance with the number of reciprocations of the divider box.

At each upstroke or up and down movement of the division box, the pump operating 146 and 138 will be given one stroke, delivering a desired charge of oil to the junction 117, which as is indicated in Figs. 1 and 2 is positioned at the top of the front wall 42 of the reservoir.

It is sometimes desirable to supply sufficient oil before starting up machine to the lubricating bearing faces of the divider box, the piston pockets, the knife and the ram, and this may be done by providing means for manually actuating the pumps 74 and 74' without operation of the machine until these surfaces are thoroughly lubricated.

After this lubrication, the automatic operation of the pumps will keep the surfaces supplied with sufficient lubricant.

It will be understood that many changes could be made in the particular features of mechanism as shown, and many apparently widely different embodiments of this invention could be made without departing from the scope thereof, and it is intended that all matter contained in the above description shall be interpreted as illustrative and not in a limiting sense.

What is claimed is:

1. In a dough divider machine of the type having a vertically reciprocatory division box and a plurality of piston pockets carried by said division box, a reservoir carried in said division box, a reciprocatory pump positioned in said reservoir, a lever for actuating said pump, a fixed adjustable device upon said machine to reciprocate said lever and cause reciprocation of the pump upon each reciprocation of said divider box, a junction positioned in said divider box fed from said pump and a plurality of outlet connections to the bearing surface of the divider box and to the piston pockets of the divider box, each provided with a highly restricted outlet flow metering fitting.

2. In a dough divider machine of the type having a reciprocatory knife for cutting off portions of dough and reciprocatory rams for feeding said cut-off portions of dough to a divider structure, a reservoir mounted in the base of the machine, a small elongated unpacked plunger pump positioned in said reservoir having a connecting rod and a U-shaped mounting bracket forming a bearing for said connecting rod, a lever mounted on said bracket actuating said connecting rod, an actuator rod connected to reciprocate said lever, an eccentric on the machine to reciprocate said rod and a lubricant distributing installation supplied by said pump to feed the bearings of said knife and said rams.

3. In a dough divider machine of the type having a reciprocatory knife for cutting off portions of dough and reciprocatory rams for feeding said cut-off portions of dough to a divider structure, a reservoir mounted in the base of the machine, a small elongated unpacked plunger pump positioned in said reservoir having a connecting rod and a U-shaped mounting bracket forming a bearing for said connecting rod, a lever mounted on said bracket actuating said connecting rod, an actuator rod connected to reciprocate said lever, an eccentric on the machine to reciprocate said rod and a lubricant distributing installation supplied by said pump to feed the bearings of said knife and said rams, said distribution system being provided with a junction positioned above the knife and the ram and a plurality of highly restricted tubes having coiled portions and having the small bores to distribute lubricant to the ram and knife bearing faces.

4. In a dough divider machine of the type having a reciprocatory knife for cutting off portions of dough and reciprocatory rams for feeding said cut-off portions of dough to a divider structure, a reservoir mounted in the base of the machine, a small elongated unpacked plunger pump positioned in said reservoir having a connecting rod and a U-shaped mounting bracket forming a bearing for said connecting rod, a lever mounted on said bracket actuating said connecting rod, an actuator rod connected to reciprocate said lever, an eccentric on the machine to reciprocate said rod and a lubricant distributing installation supplied by said pump to feed the bearings of said knife and said rams, said lubricant being fed to said knife and ram bearings in excess, and means for collecting said excess quantities of lubricant, filtering the same and returning it to said reservoir.

5. In a dough divider machine of the type having a vertically reciprocatory division box and a plurality of piston pockets carried by said division box, a reservoir carried in said division box, a reciprocatory pump positioned in said reservoir, a lever for actuating said pump, a fixed adjustable device upon said machine to reciprocate said lever and cause reciprocation of the pump upon each reciprocation of said divider box, a junction positioned in said divider box fed from said pump and a plurality of outlet connections to the bearing surface of the divider box and to the piston pockets of the divider box, each provided with a highly restricted outlet flow metering fitting, said lever being provided with two arms, one positioned interiorly of the reservoir and the other positioned exteriorly of the reservoir and a shaft extending through the reservoir connecting said arms.

EDWARD H. KOCHER.